(12) United States Patent
Park et al.

(10) Patent No.: US 11,784,519 B2
(45) Date of Patent: Oct. 10, 2023

(54) ROTOR HAVING FIXING PROTRUSIONS PROVIDED ASYMMETRICALLY BASED ON SHAFT KEY

(71) Applicants: Hyundai Motor Company, Seoul (KR); Kia Motors Corporation, Seoul (KR)

(72) Inventors: Kyung Soo Park, Hwaseong-Si (KR); Jung Woo Lee, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 262 days.

(21) Appl. No.: 17/144,454

(22) Filed: Jan. 8, 2021

(65) Prior Publication Data

US 2022/0045563 A1     Feb. 10, 2022

(30) Foreign Application Priority Data

Aug. 5, 2020 (KR) .......... 10-2020-0097874

(51) Int. Cl.
*H02K 1/27* (2022.01)
*H02K 1/28* (2006.01)
*H02K 1/276* (2022.01)

(52) U.S. Cl.
CPC ............. *H02K 1/276* (2013.01); *H02K 1/28* (2013.01)

(58) Field of Classification Search
CPC ........ H02K 1/276; H02K 1/28; H02K 1/2766; H02K 2213/03; H02K 1/27; H02K 15/03; H02K 21/12; H01F 41/0233
See application file for complete search history.

(56) References Cited

U.S. PATENT DOCUMENTS

| | | | |
|---|---|---|---|
| 8,803,394 B2 | 8/2014 | Sano et al. | |
| 2008/0224558 A1* | 9/2008 | Ionel | H02K 1/2766 310/156.57 |
| 2010/0026128 A1* | 2/2010 | Ionel | H02K 1/276 310/156.53 |
| 2014/0265707 A1* | 9/2014 | Klein | H02K 29/03 29/598 |
| 2019/0363619 A1* | 11/2019 | Zhu | H02K 15/03 |

* cited by examiner

*Primary Examiner* — Thomas Truong
(74) *Attorney, Agent, or Firm* — MORGAN, LEWIS & BOCKIUS LLP

(57) ABSTRACT

A rotor applied to a driving motor may include a plurality of rotor cores configured to define a plurality of slots, into which permanent magnets are inserted, wherein each of the rotor cores includes a first zone and a second zone different from each other in terms of positions at which fixing protrusions configured to fix the permanent magnets are provided in the slots, and the rotor cores are stacked such that the first zones of some of the rotor cores overlap the second zones of some of the rotor cores.

13 Claims, 9 Drawing Sheets

ROTOR HAVING FIXING PROTRUSIONS PROVIDED ASYMMETRICALLY BASED ON SHAFT KEY

CROSS-REFERENCE TO RELATED APPLICATION

The present application claims priority to Korean Patent Application No. 10-2020-0097874 filed on Aug. 5, 2020, the entire contents of which is incorporated herein for all purposes by this reference.

BACKGROUND OF THE INVENTION

Field of the Invention

The present invention relates to a rotor having fixing protrusions provided asymmetrically based on a shaft key, the rotor being configured using rotor cores including zones having different patterns of providing fixing protrusions.

Description of Related Art

A driving motor applied to a green vehicle requires high efficiency and output density. In particular, an electric vehicle (EV) acquires all power from the driving motor. For this reason, required torque and output of the driving motor are further increased. An electric vehicle (EV), which was limited to cars in the early stage, has been extended to sports cars, trucks, and buses, whereby required torque and output of the driving motor have been further increased. To acquire high-level torque and output in a limited vehicle space, however, high torque and output densities are required.

A buried permanent-magnet synchronous motor is generally used as a driving motor for environmentally friendly vehicles. The permanent-magnet synchronous motor is characterized in that a permanent magnet is inserted into a rotor core and is fixed by a magnet-fixing protrusion. As magnetic flux leakage increases at the position at which the fixing protrusion is provided, torque density is reduced, whereby performance of the driving motor deteriorates. In the case in which the number of permanent magnets that are used is increased to compensate for the reduced torque of the driving motor, cost competitiveness is reduced due to an increase in motor material cost. In the case in which the amount of current is increased to compensate for the reduced torque of the driving motor, on the other hand, inverter device cost is increased and efficiency is lowered.

The above information included in this Background section is provided only for enhancement of understanding of the background of the invention and may not be taken as an acknowledgement or any form of suggestion that this information forms the prior art already known to a person skilled in the art.

BRIEF SUMMARY

Various aspects of the present invention are directed to providing a rotor applied to a driving motor, the rotor being configured such that force necessary to fix permanent magnets is maintained while the number of fixing protrusions provided in rotor cores is reduced.

Various aspects of the present invention are directed to providing a rotor applied to a driving motor, the rotor being configured such that the stacked structure of rotor cores having the same shape is changed to reduce the number of fixing protrusions provided in each of the rotor cores.

The objects of the present invention are not limited to those described above. The objects of the present invention will be clearly understood from the following description and could be implemented by means defined in the claims and a combination thereof.

Various aspects of the present invention are directed to providing a rotor applied to a driving motor, the rotor including a plurality of rotor cores configured to define a plurality of slots, into which permanent magnets are inserted, wherein each of the rotor cores includes a first zone and a second zone different from each other in terms of positions at which fixing protrusions configured to fix the permanent magnets are provided in the slots, and the rotor cores are stacked such that the first zones of some of the rotor cores overlap the second zones of some of the rotor cores.

In various exemplary embodiments of the present invention, among the fixing protrusions, a first fixing protrusion configured to contact one surface of each of the permanent magnets in a direction in which the permanent magnets extend may be disposed in the first zone, and among the fixing protrusions, a second fixing protrusion configured to be in contact with the other surface of each of the permanent magnets in a direction in which the permanent magnets extend may be disposed in the second zone.

In various exemplary embodiments of the present invention, each of the rotor cores may include a first shaft key and a second shaft key configured to be coupled to recesses of a shaft of the driving motor, the rotor cores may include first rotor cores and second rotor cores having different stacking directions, and the first rotor cores and the second rotor cores may be stacked such that the first shaft keys of the first rotor cores and the second shaft keys of the second rotor cores overlap each other.

In various exemplary embodiments of the present invention, the first zones of the first rotor cores and the second zones of the second rotor cores may be stacked to overlap each other, and opposite surfaces of the permanent magnets may be fixed in directions in which the permanent magnets extend by the first fixing protrusions provided in the first zone and the second fixing protrusions provided in the second zone.

In various exemplary embodiments of the present invention, the second rotor cores may be stacked after the first rotor cores are stacked to form the rotor.

In various exemplary embodiments of the present invention, the first rotor cores and the second rotor cores may be alternately stacked to form the rotor.

In various exemplary embodiments of the present invention, each of the rotor cores includes eight poles, the first zone may be a zone occupied by four successive poles, among the eight poles, and the second zone may be a zone other than the first zone.

In various exemplary embodiments of the present invention, the position of the fixing protrusion provided in one pole of the eight poles may be different from the position of the fixing protrusion provided in another pole disposed opposite to the one pole based on a rotation shaft hole of the rotor.

In various exemplary embodiments of the present invention, the first zone may be provided with a first fixing protrusion configured to fix one surface of each of the permanent magnets in a direction in which the permanent magnets extend and a second fixing protrusion configured to fix the other surface of each of the permanent magnets, the second zone may be provided with the second fixing protrusions, and the other surface may be a surface adjacent to axis D of the driving motor.

In various exemplary embodiments of the present invention, the fixing protrusion may be provided at one side of the first zone divided by axis D of the driving motor for one pole of the rotor, and the fixing protrusion may be provided at the other side of the second zone.

Various aspects of the present invention are directed to providing a rotor applied to a driving motor, the rotor including a plurality of rotor cores configured to define a plurality of slots, into which permanent magnets are inserted, wherein each of the rotor cores includes a first zone provided with fixing protrusions configured to fix the permanent magnets and a second zone provided with no fixing protrusions, and the rotor cores are stacked such that the first zones of some of the rotor cores overlap the second zones of some of the rotor cores.

In various exemplary embodiments of the present invention, each of the rotor cores may include a first shaft key and a second shaft key configured to be coupled to recesses of a shaft of the driving motor, the rotor cores may include first rotor cores and second rotor cores having different stacking directions, and the first rotor cores and the second rotor cores may be stacked such that the first shaft keys of the first rotor cores and the second shaft keys of the second rotor cores overlap each other.

In various exemplary embodiments of the present invention, each of the rotor cores may include eight poles, the first zone may be a zone occupied by four successive poles, among the eight poles, and the second zone may be a zone other than the first zone.

Other aspects and exemplary embodiments of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
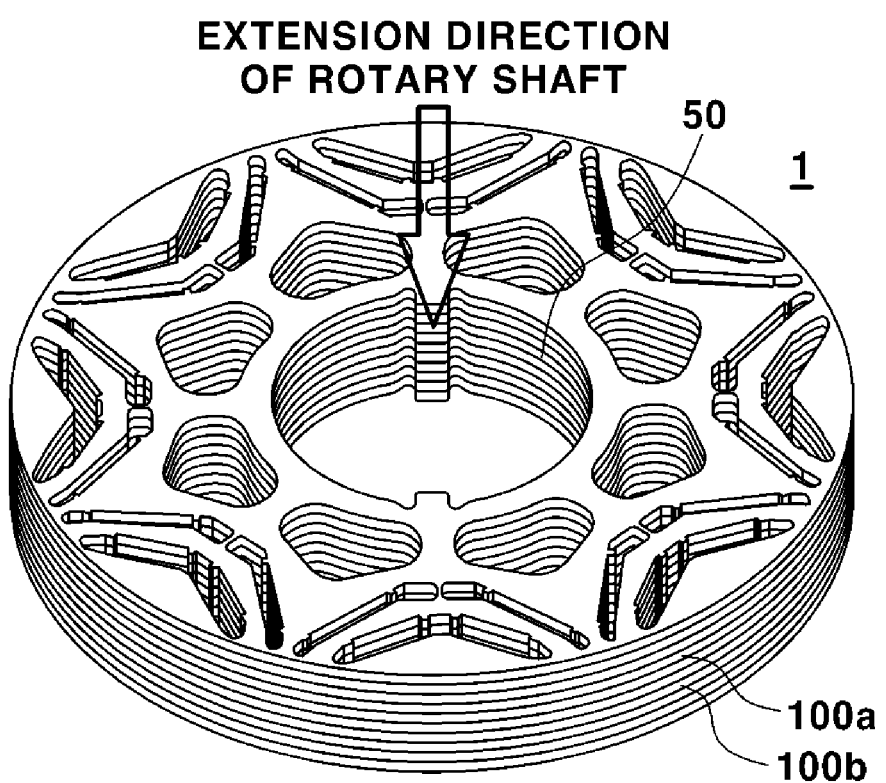
FIG. 1 is a view showing a stacked structure of rotor cores applied to a driving motor according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Advantages and features of the present invention and methods for achieving the same will be clearly understood with reference to the following detailed description of embodiments However, the present invention is not limited to the exemplary embodiments included herein and may be implemented in various different forms. The exemplary embodiments are merely provided to make the present invention of the present invention perfect and to perfectly instruct the scope of the present invention to those skilled in the art, and the present invention may be defined by the scope of claims. Like reference numbers refer to like elements throughout the specification.

The term "unit" or "module" used in the exemplary embodiment signifies one unit that processes at least one function or operation, and may be realized by hardware, software, or a combination thereof.

Furthermore, relational terms, such as "first" and "second," are used in the exemplary embodiment only to distinguish between the same elements, and the elements are not limited as to the sequence therebetween in the following description.

The above detailed description illustrates the present invention. Furthermore, the foregoing describes exemplary embodiments of the present invention. The present invention may be used in various different combinations, changes, and environments. That is, variations or modifications may be made within the conceptual scope of the present invention, equivalents to the present invention of the present invention, and/or the scope of technology and knowledge in the art to which various exemplary embodiments of the present invention pertains. The exemplary embodiments describe the best mode for realizing the technical concept of the present invention, and variations required for the concrete application and use of the present invention are possible. Therefore, the above detailed description does not limit the present invention included above. Furthermore, the appended claims may be interpreted to include other embodiments.

FIG. 1 is a view showing a stacked structure of rotor cores applied to a driving motor according to various exemplary embodiments of the present invention.

Referring to FIG. 1, a rotor 1 may include a first rotor core 100a and a second rotor core 100b. The rotor 1 may include several tens to hundreds of stacked first rotor cores 100a and second rotor cores 100b. The first rotor core 100a and the second rotor core 100b may be stacked in an extension direction of a rotation shaft inserted into a rotation shaft hole 50. In the figure, the first rotor core 100a and the second rotor core 100b may be stacked in a vertical direction thereof.

The first rotor core 100a and the second rotor core 100b may have the same shape. However, the first rotor core 100a and the second rotor core 100b may be different from each other in terms of the stacked position (or direction) thereof. For example, the first rotor core 100a and the second rotor core 100b may be stacked to deviate from each other by 180 degrees based on the rotation shaft hole 50. That is, the second rotor core 100b may be stacked on the first rotor core 100a after being rotated 180 degrees based on the stacked direction of the first rotor core 100a.

Figure 2:
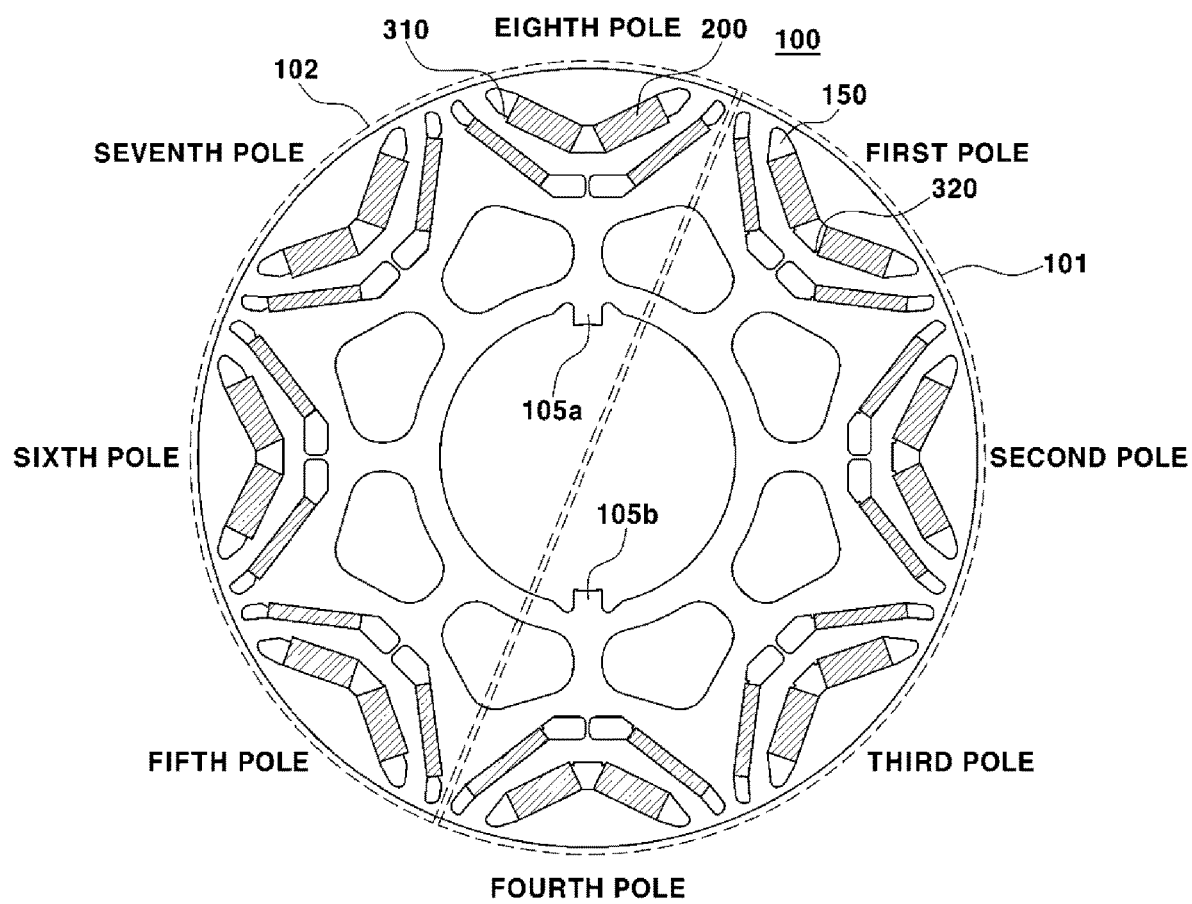
FIG. 2 is a view showing a rotor core according to various exemplary embodiments of the present invention.

FIG. 2 is a view showing a rotor core according to various exemplary embodiments of the present invention.

Referring to FIG. 2, the rotor core 100 may include a first zone 101 and a second zone 102 different from each other in terms of positions at which fixing protrusions 310 and 320 configured to fix permanent magnets 200 are provided in slots 150. The first zone 101 and the second zone 102 may mean two divided portions of the rotor core 100. The fixing protrusions 310 and 320 may be configured to fix the permanent magnets 200 inserted into the slots 150. The rotor core 100 may be provided with shaft keys 105a and 105b coupled to recesses of a shaft of the driving motor. The shaft keys 105a and 105b may be disposed at opposite positions based on the rotation shaft hole 50 (see FIG. 1). The stacked direction or position of rotor cores 100 may be set through positioning of the shaft keys 105a and 105b.

The rotor core 100 may be divided into eight poles. Each of the first zone 101 and the second zone 102 may mean a zone occupied by four successive poles, among the eight poles. Since the first zone 101 and the second zone 102 do not overlap each other, the second zone 102 may mean a zone other than the first zone 101. For example, the first zone 101 may include a first pole, a second pole, a third pole, and a fourth pole, and the second zone 102 may include a fifth pole, a sixth pole, a seventh pole, and an eighth pole.

As an example, a second fixing protrusion 320 configured to contact one surface of each of the permanent magnets 200 in a direction in which the permanent magnet 200 extends may be disposed in the first zone 101. A first fixing protrusion 310 configured to contact with the other surface of each of the permanent magnets 200 in the direction in which the permanent magnet 200 extends may be disposed in the second zone 102. That is, the first fixing protrusions 310 and the second fixing protrusions 320 are not provided in all slots 150 formed in the rotor core 100. Only the second fixing protrusions 320 may be provided in the first zone 101, and only the first fixing protrusions 310 may be provided in the second zone 102.

In the case in which the fixing protrusions 310 and 320 are adopted to fix the permanent magnets 200, magnetic flux leakage occurs at positions at which the fixing protrusions 310 and 320 are disposed. Due to magnetic flux leakage, torque of the driving motor is reduced. In the exemplary embodiment of the present invention, the first fixing protrusions 310 and the second fixing protrusions 320 are not provided in all slots 150 of the rotor core 100. One rotor core 100 may be divided into two zones, the first fixing protrusions 310 may be provided in one of the zones, and the second fixing protrusions 320 may be provided in the other zone. As a result, the total number of fixing protrusions 310 and 320 provided in one rotor core 100 may be reduced.

Figure 3:
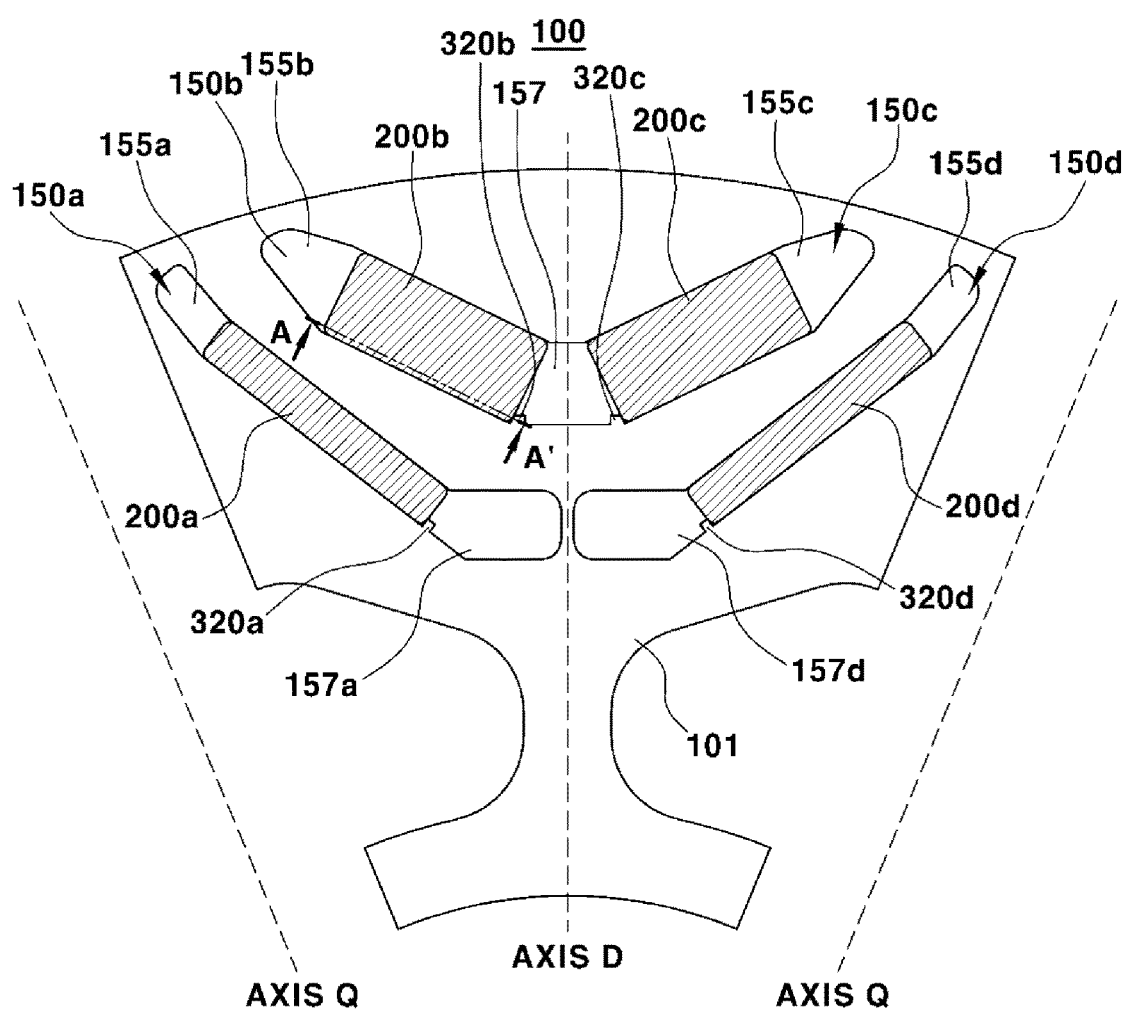
FIG. 3 is a view showing one pole of the rotor core disposed in a first zone of FIG. 2.

FIG. 3 is a view showing one pole of the rotor core disposed in the first zone of FIG. 2.

Referring to FIG. 1, FIG. 2, and FIG. 3, the rotor core 100 may include a plurality of slots 150a, 150b, 150c, and 150d, a plurality of permanent magnets 200a, 200b, 200c, and 200d, a plurality of first fixing protrusions 310b and 310c, and a plurality of second fixing protrusions 320a, 320b, 320c, and 320d. FIG. 3 shows a portion forming one pole provided in the first zone 101 of the rotor core 100, and the first pole of the driving motor may have the four permanent magnets 200a, 200b, 200c, and 200d.

The slots 150a, 150b, 150c, and 150d may be formed in the first zone 101 of the rotor core 100. The slots 150a, 150b, 150c, and 150d may mean spaces into which the permanent magnets 200a, 200b, 200c, and 200d are inserted, respectively, and the shape and number thereof may be variously changed. In the exemplary embodiment of the present invention, the slots 150a, 150b, 150c, and 150d may be provided in a form in which V shapes are duplicated, i.e., a double V shape. After the permanent magnets 200a, 200b, 200c, and 200d are inserted into the slots 150a, 150b, 150c, and 150d, respectively, an empty space may remain in a portion of each slot. Empty spaces defined after the permanent magnets 200a, 200b, 200c, and 200d and the second fixing protrusions 320a, 320b, 320c, and 320d are disposed in the slots 150a, 150b, 150c, and 150d, respectively, may be barriers 155a, 155b, 155c, 155d, 157, 157a, and 157d. In the figure, the barriers 155a, 155b, 155c, 155d, 157, 157a, and 157d may include first barriers 155a, 155b, 155c, and 155d disposed at the upper side and second barriers 157, 157a, and 157d disposed at the lower side thereof. The first barriers 155a, 155b, 155c, and 155d may be spaced from each other, the second barriers 157, 157a, and 157d may be spaced from each other, and the first barriers 155a, 155b, 155c, and 155d and the second barriers 157, 157a, and 157d may be spaced from each other. The barriers 155a, 155b, 155c, 155d, 157, 157a, and 157d may be filled with epoxy resin or air, whereby it is possible to minimize leakage of magnetic flux generated from the permanent magnets 200a, 200b, 200c, and 200d at the rotor core 100.

The four permanent magnets 200a, 200b, 200c, and 200d may be disposed in the slots 150a, 150b, 150c, and 150d, respectively. The first permanent magnet 200a may be inserted into the first slot 150a, the second permanent magnet 200b may be inserted into the second slot 150b, the third permanent magnet 200c may be inserted into the third slot 150c, and the fourth permanent magnet 200d may be inserted into the fourth slot 150d.

As an example, the permanent magnets 200a, 200b, 200c, and 200d may form a pair of permanent magnet sets. In the exemplary embodiment of the present invention, the first permanent magnet 200a and the fourth permanent magnet 200d may form a pair of permanent magnets, and the second permanent magnet 200b and the third permanent magnet 200c may form another pair of permanent magnets. That is, each pair of permanent magnets may be disposed in a V shape. The permanent magnets 200a, 200b, 200c, and 200d may form a pair of permanent magnet sets symmetrical with respect to axis D of the driving motor, and the permanent magnet sets may be two permanent magnet sets overlapping in a radial direction based on the rotation shaft hole 50 defined in the rotor 1. Axis D, which is an axis at which magnetic flux of the driving motor is generated, may be an axis defined in a space between each pair of permanent magnets. Axis Q, which is an axis located ahead of axis D by 90 degrees in a counterclockwise direction thereof, may be an axis defined in a space outside each pair of permanent magnets. The surface of each of the permanent magnets 200a, 200b, 200c, and 200d adjacent to axis D may be defined as one surface, and the surface of each of the permanent magnets 200a, 200b, 200c, and 200d adjacent to axis Q may be defined as the other surface. One surface of each of the permanent magnets 200a, 200b, 200c, and 200d may be adjacent to a corresponding one of the first barriers 155a, 155b, 155c, and 155d, and the other surface of each of the permanent magnets 200a, 200b, 200c, and 200d may be adjacent to a corresponding one of the second barriers 157, 157a, and 157d.

The second fixing protrusions 320a, 320b, 320c, and 320d may be disposed in the slots 150a, 150b, 150c, and 150d, respectively. The second fixing protrusions 320a, 320b, 320c, and 320d may guide directions in which the permanent magnets 200a, 200b, 200c, and 200d are disposed, respectively, and may fix the permanent magnets 200a, 200b, 200c, and 200d in the slots 150a, 150b, 150c, and 150d, respectively. Each of the second fixing protrusions 320a, 320b, 320c, and 320d may abut the other surface of a corresponding one of the permanent magnets 200a, 200b, 200c, and 200d in the longitudinal direction in which the corresponding one of the permanent magnets 200a, 200b, 200c, and 200d extends to fix the corresponding one of the permanent magnets 200a, 200b, 200c, and 200d. The second fixing protrusions 320a, 320b, 320c, and 320d may be adjacent to the second barriers 157, 157a, and 157d, respectively.

As an example, each of the second fixing protrusions 320a, 320b, 320c, and 320d may protrude from one surface of a corresponding one of the slots 150a, 150b, 150c, and 150d abutting the permanent magnets 200a, 200b, 200c, and 200d, respectively, toward the corresponding one of the slots 150a, 150b, 150c, and 150d.

Figure 4:
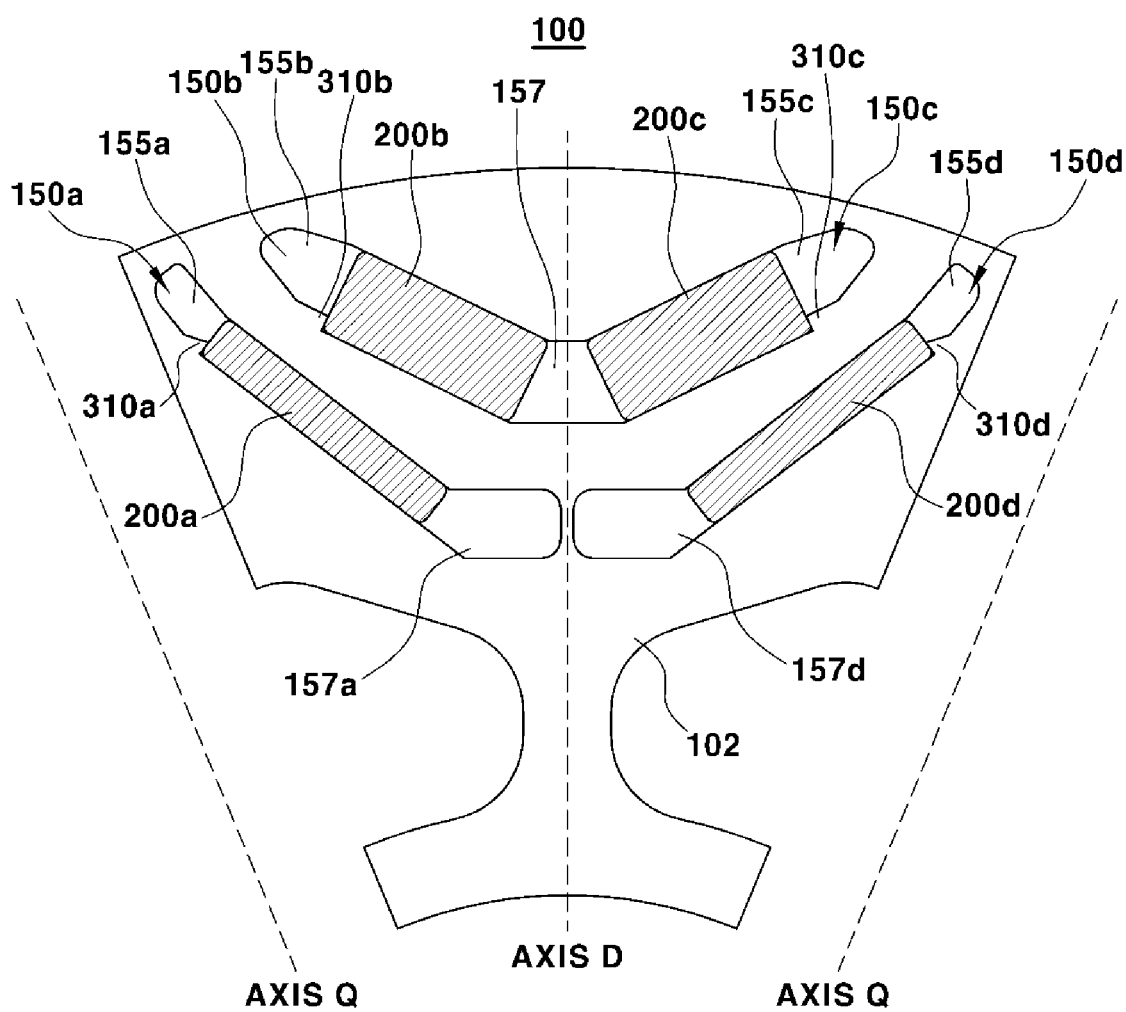
FIG. 4 is a view showing one pole of the rotor core disposed in a second zone of FIG. 2.

FIG. 4 is a view showing one pole of the rotor core disposed in the second zone of FIG. 2. For simplicity of description, a duplicative description of the construction identical to that shown in FIG. 3 will be omitted.

Referring to FIGS. 1, 2, and 4, the rotor core 100 may include a plurality of slots 150a, 150b, 150c, and 150d, a plurality of permanent magnets 200a, 200b, 200c, and 200d, and a plurality of first fixing protrusions 310a, 310b, 310c and 310d. FIG. 4 shows a portion forming one pole provided in the second zone 102 of the rotor core 100, and the first pole of the driving motor may have the four permanent magnets 200a, 200b, 200c, and 200d. The first fixing protrusions 310a, 310b, 310c and 310d may be provided in the second zone 102 of the rotor core 100, and each of the first fixing protrusions 310a, 310b, 310c and 310d may contact one surface of a corresponding one of the permanent magnets 200a, 200b, 200c, and 200d in the longitudinal direction in which the corresponding one of the permanent magnets 200a, 200b, 200c, and 200d extends to fix the corresponding one of the permanent magnets 200a, 200b, 200c, and 200d. Each of the first fixing protrusions 310a, 310b, 310c and 310d may be disposed outside a corresponding one of the permanent magnets 200a, 200b, 200c, and 200d based on the rotation shaft hole 50. The first fixing protrusions 310a, 310b, 310c and 310d may be disposed adjacent to the first barriers 155a, 155b, 155c, and 155d, respectively.

As an example, each of the first fixing protrusions 310a, 310b, 310c and 310d may protrude from one surface of a corresponding one of the slots 150a, 150b, 150c, and 150d abutting the permanent magnets 200a, 200b, 200c, and 200d, respectively, toward the corresponding one of the slots 150a, 150b, 150c, and 150d.

That is, the second zone 102 of the rotor core 100 may have the same shape as the first zone 101 (see FIG. 3) except for the positions at which the fixing protrusions are disposed.

Figure 5:
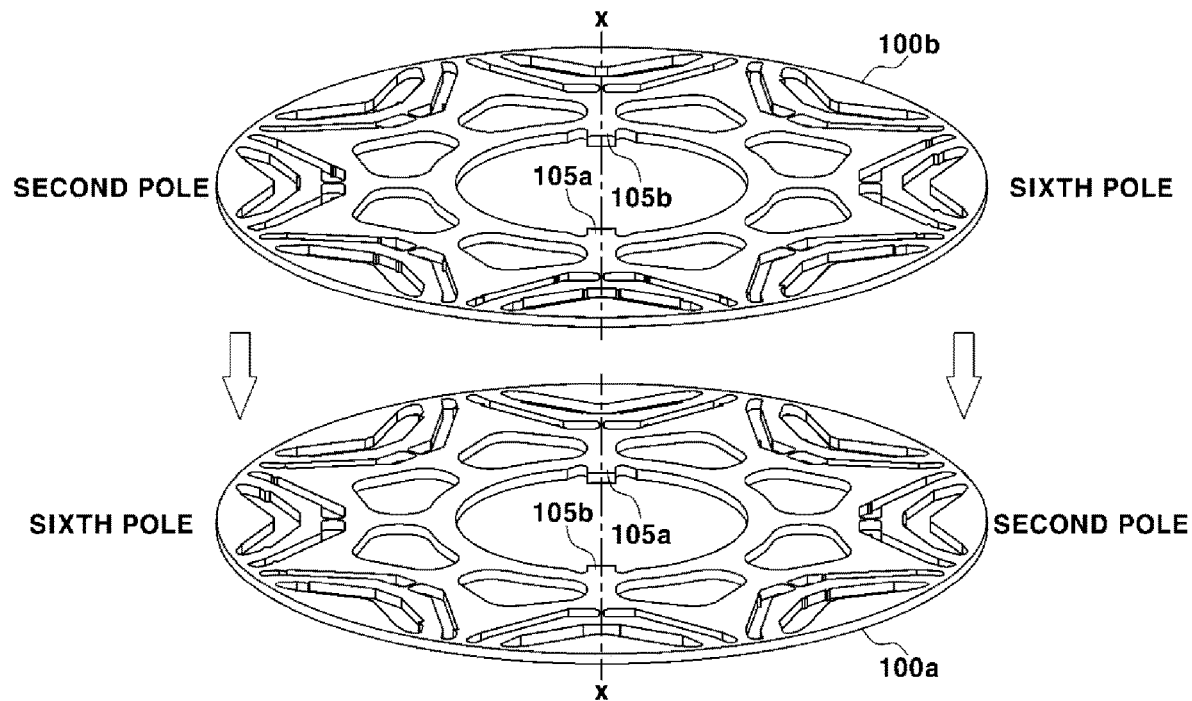
FIG. 5 is a view showing a method of stacking rotor cores according to various exemplary embodiments of the present invention.

FIG. 5 is a view showing a method of stacking rotor cores according to various exemplary embodiments of the present invention.

Referring to FIG. 1, FIG. 2, FIG. 3, FIG. 4, and FIG. 5, each rotor core 100 may be defined as a first rotor core 100a or a second rotor core 100b based on the stacked position thereof. The first zone 101 of one of the rotor cores 100a and 100b may overlap the second zone 102 of the other of the rotor cores 100a and 100b to form a rotor 1. The rotor cores 100a and 100b may include a first rotor core 100a and a second rotor core 100b stacked in different directions. Since two shaft keys 105a and 105b are provided to be fixed to recesses in the shaft, the rotor cores 100a and 100b may be stacked in the state in which one rotor core is rotated only 180 degrees based on the position at which the other rotor core is stacked. The shaft keys 105a and 105b may include a first shaft key 105a and a second shaft key 105b provided to face each other.

As an example, each of the rotor cores 100a and 100b may include a first shaft key 105a and a second shaft key 105b. The rotor cores 100a and 100b may include a first rotor core 100a and a second rotor core 100b different from each other in terms of the stacked position (or direction) thereof. At the instant time, the first rotor core 100a and the second rotor core 100b may be stacked such that the first shaft key 105a of the first rotor core 100a and the second shaft key 105b of the second rotor core 100b overlap each other. Furthermore, the first rotor core 100a and the second rotor core 100b may be stacked such that the second shaft key 105b of the first rotor core 100a and the first shaft key 105a of the second rotor core 100b overlap each other. At the instant time, the stacked direction of the first rotor core 100a and the stacked direction of the second rotor core 100b may be different from each other by an angle of 180 degrees based on a connection line x interconnecting the two shaft keys 105a and 105b. The first zone 101 of the first rotor core 100a may be stacked to overlap the second zone 102 of the second rotor core 100b. For example, the second pole of the first rotor core 100a may be stacked to overlap the sixth pole of the second rotor core 100b, and the sixth pole of the first rotor core 100a may be stacked to overlap the second pole of the second rotor core 100b. As a result, opposite surfaces of the permanent magnets 200a, 200b, 200c, and 200d may be fixed by the second fixing protrusions 320a, 320b, 320c, and 320d provided in the first zone 101 and the first fixing protrusions 310a, 310b, 310c and 310d provided in the second zone 102. That is, although only the second fixing protrusions 320a, 320b, 320c, and 320d are provided in the first zone 101 and only the first fixing protrusions 310a, 310b, 310c and 310d are provided in the second zone 102, opposite surfaces of the permanent magnets 200a, 200b, 200c, and 200d may be fixed by the first fixing protrusions 310a, 310b, 310c and 310d and the second fixing protrusions 320a, 320b, 320c, and 320d as the result of stacking of the plurality of rotor cores 100a and 100b.

According to various exemplary embodiments of the present invention, it is possible to reduce the number of fixing protrusions provided in one rotor core as the result of rotational stacking of the rotor cores 100a and 100b, between which tolerance may be generated. The number of fixing protrusions provided in each of the rotor cores 100a and 100b according to various exemplary embodiments of the present invention may be half the number of fixing protrusions provided to fix opposite surfaces of the permanent magnets 200a, 200b, 200c, and 200d. Consequently, magnetic flux leakage may be reduced as the result of reduction in the number of fixing protrusions, which leads to an increase in torque density of the driving motor.

According to various exemplary embodiments of the present invention, it is possible to reduce the number of fixing protrusions as the result of rotational stacking of the rotor cores 100a and 100b, which are manufactured to have a single shape, and therefore it is possible to simplify the process and to reduce manufacturing cost, compared to the case in which rotor cores having different shapes are manufactured.

Figure 6:
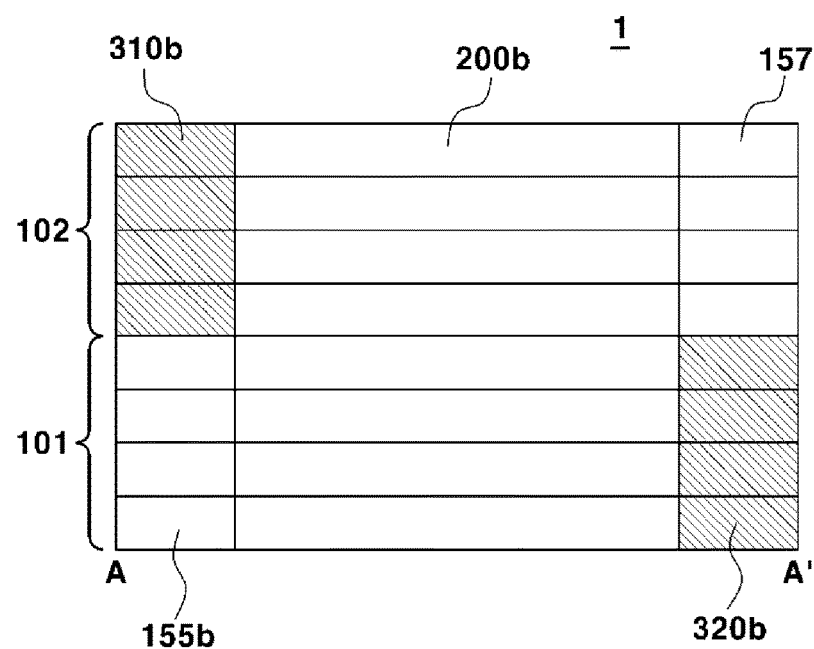
FIG. 6 is a view showing a stacked form of rotor cores according to various exemplary embodiments of the present invention.

FIG. 6 is a view showing a stacked form of rotor cores according to various exemplary embodiments of the present invention. FIG. 6 is a sectional view taken along line A-A' of FIG. 3 after the rotor cores are stacked.

Referring to FIGS. 3, 4, and 6, the first zones 101 and the second zones 102 of the rotor cores 100 may be stacked to overlap each other. Based on the A-A' section, the first zones 101 in which the first fixing protrusions 320b are provided may be stacked, and then the second zones 102 in which the second fixing protrusions 310b are provided may be stacked. The permanent magnets 200b inserted into the rotor cores 100 may be fixed by the first fixing protrusions 320b and the second fixing protrusions 310b. Consequently, it is possible to fix opposite surfaces of the permanent magnets 200b using the fixing protrusions while reducing the number of fixing protrusions provided in the rotor cores 100, whereby it is possible to maintain force necessary to fix the permanent magnets 200b.

Figure 7:
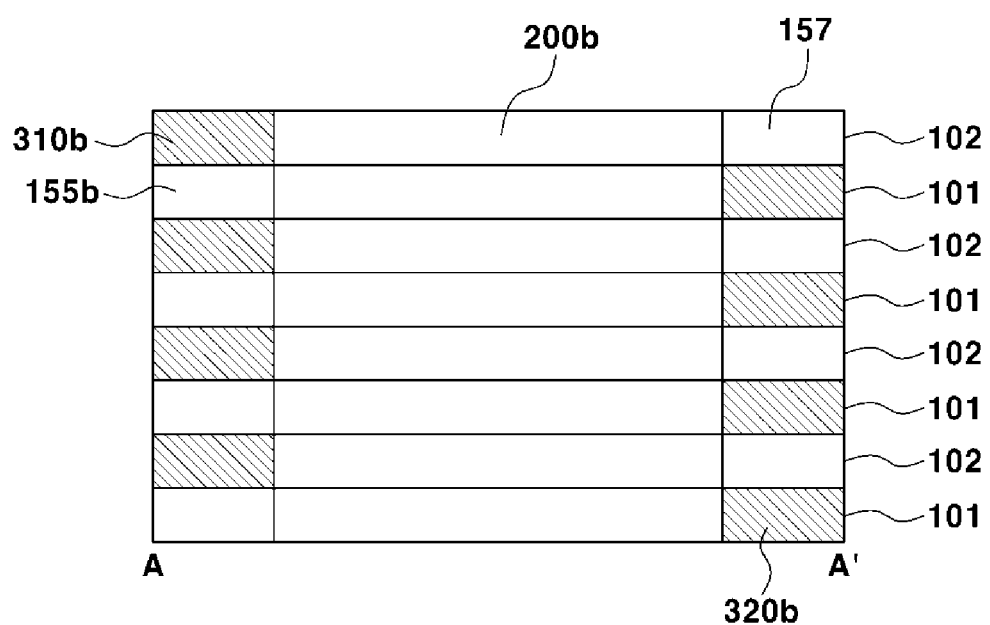
FIG. 7 is a view showing a stacked form of rotor cores according to various exemplary embodiments of the present invention.

FIG. 7 is a view showing a stacked form of rotor cores according to various exemplary embodiments of the present invention. FIG. 7 is a sectional view taken along line A-A' of FIG. 3 after the rotor cores are stacked.

Referring to FIGS. 3, 4, and 7, the first zones 101 and the second zones 102 of the rotor cores 100 may be stacked to overlap each other. Based on the A-A' section, the first zones 101 in which the first fixing protrusions 320b are provided may be stacked, and then the second zones 102 in which the second fixing protrusions 310b are provided may be alternately stacked. The permanent magnets 200b inserted into the rotor cores 100 may be fixed by the first fixing protrusions 320b and the second fixing protrusions 310b. Consequently, it is possible to fix opposite surfaces of the permanent magnets 200b using the fixing protrusions while reducing the number of fixing protrusions provided in the rotor cores 100, whereby it is possible to maintain force necessary to fix the permanent magnets 200b.

Figure 8:
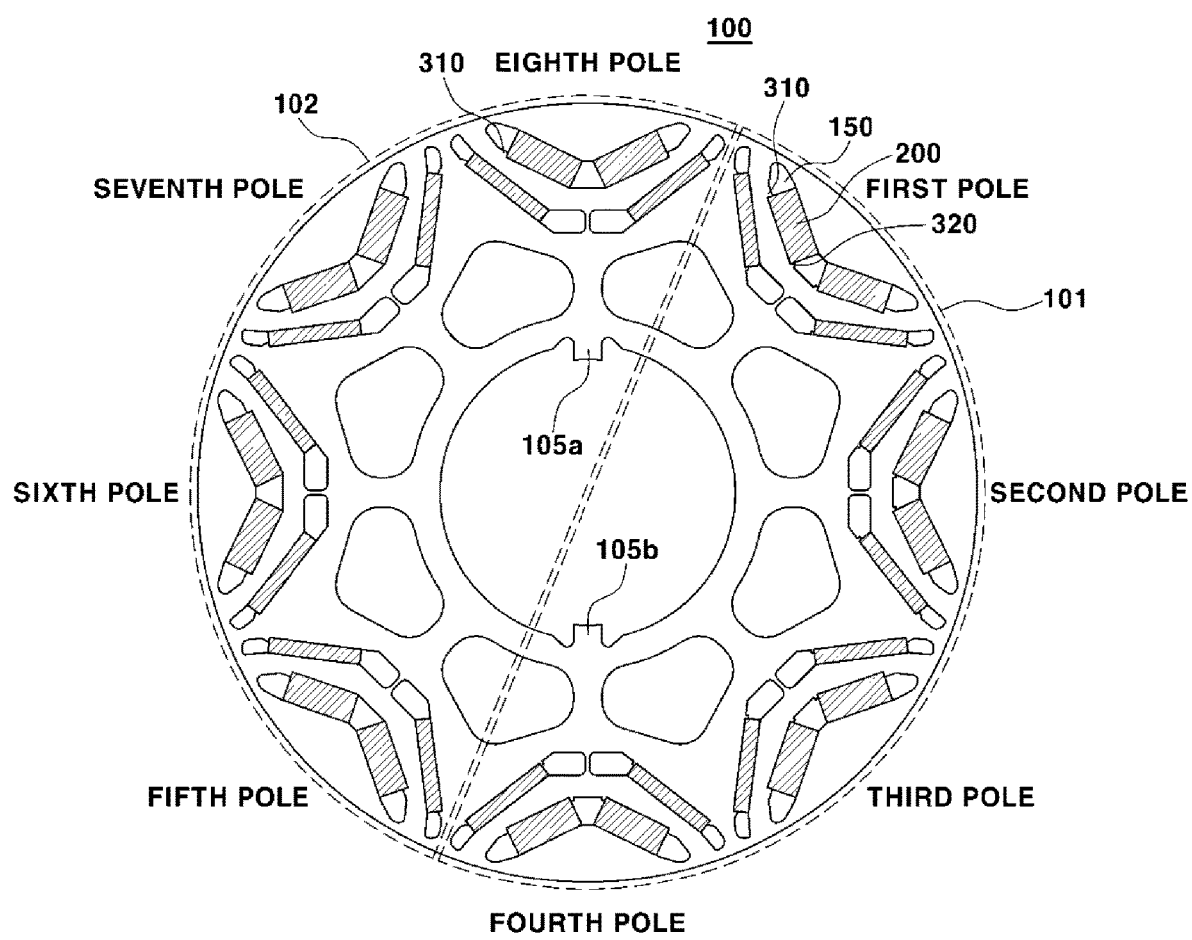
FIG. 8 is a view showing a rotor core according to various exemplary embodiments of the present invention.

FIG. 8 is a view showing a rotor core according to various exemplary embodiments of the present invention.

Referring to FIG. 8, first fixing protrusions 310 and second fixing protrusions 320 may be provided in a first zone 101, and only first fixing protrusions 310 may be provided in a second zone 102. That is, it is possible to provide a rotor core 100 configured such that the number of fixing protrusions is reduced to ¾ of the number of fixing protrusions provided in the rotor core 100.

In various exemplary embodiments of the present invention, it is possible to design a rotor core 100 having a structure in which the second fixing protrusions 320, less affected by stress from permanent magnets 200 as a rotor rotates, are maximally removed. That is, no second fixing protrusions 320 are formed in the second zone 102, whereby it is possible to reduce magnetic flux leakage. Furthermore, rotor cores 100 are stacked in the state of being rotated 180 degrees relative to each other based on shaft keys 105a and 105b, whereby it is possible to maximally maintain force necessary to fix the permanent magnets 200.

Figure 9:
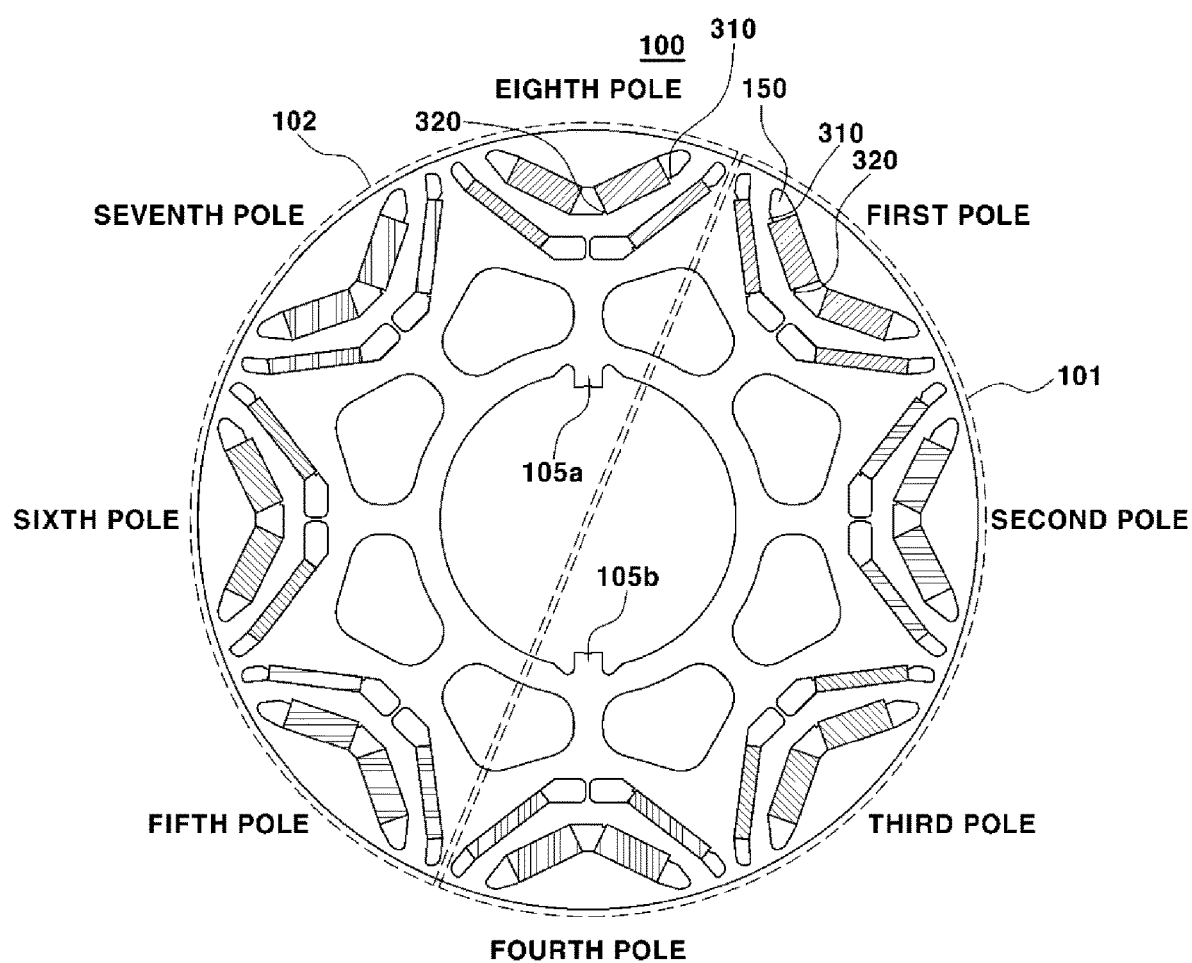
FIG. 9 is a view showing a rotor core according to various exemplary embodiments of the present invention.

FIG. 9 is a view showing a rotor core according to various exemplary embodiments of the present invention.

Both first fixing protrusions 310 and second fixing protrusions 320 may be provided in a first zone 101 and a second zone 102. In the case in which a plurality of poles of a rotor are divided based on axis D of the driving motor, however, the first fixing protrusions 310 and the second fixing protrusions 320 may be provided at only one side of the slots in the first zone 101, and the first fixing protrusions 310 and the second fixing protrusions 320 may be provided at only the other side of the slots in the second zone 102. For example, the first fixing protrusions 310 and the second fixing protrusions 320 may be provided at only the left side of the first zone 101 based on axis D of the driving motor, and the first fixing protrusions 310 and the second fixing protrusions 320 may be provided at only the right side of the second zone 102 based on axis D of the driving motor.

Figure 10:
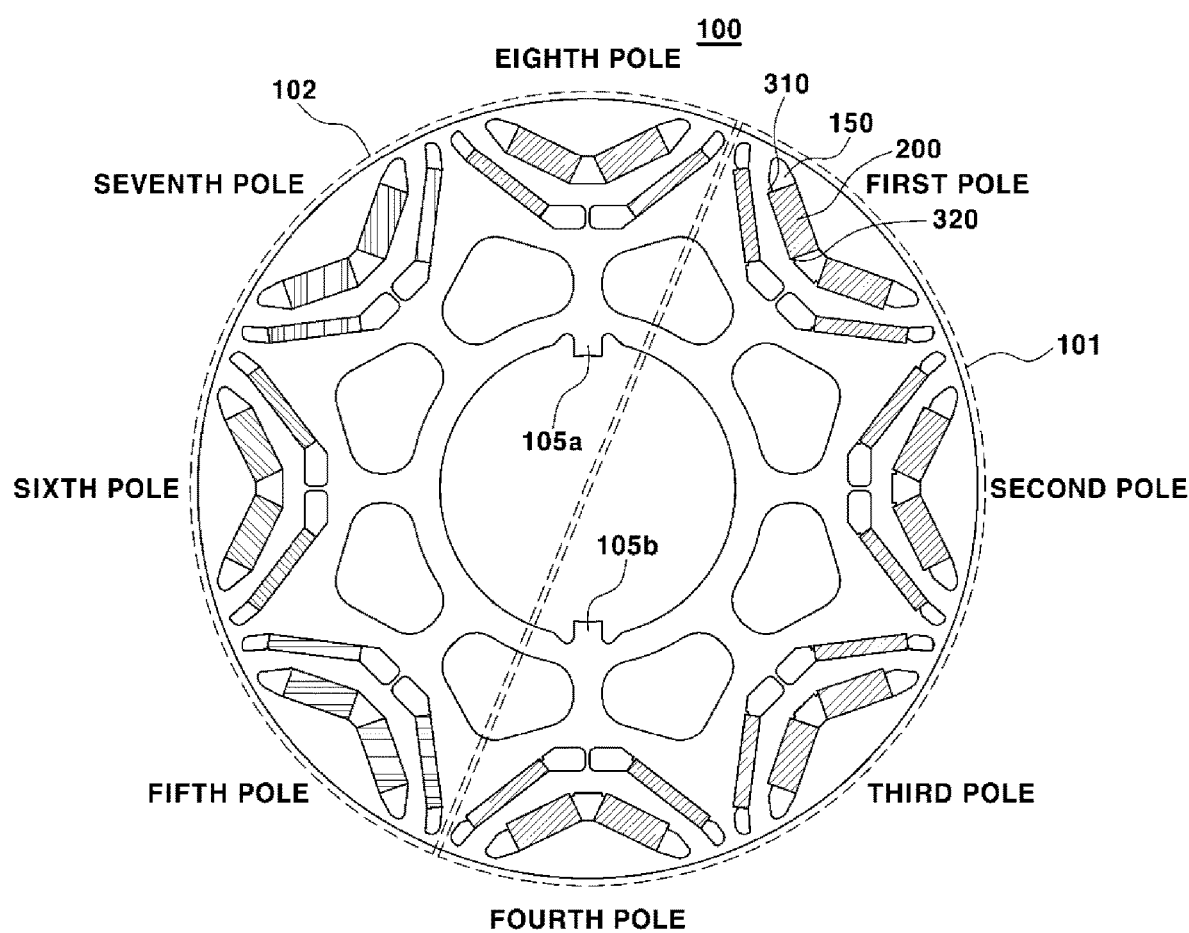
FIG. 10 is a view showing a rotor core according to various exemplary embodiments of the present invention.

FIG. 10 is a view showing a rotor core according to various exemplary embodiments of the present invention.

Referring to FIG. 10, first fixing protrusions 310 and second fixing protrusions 320 may be provided in a first zone 101, and neither first fixing protrusions 310 nor second fixing protrusions 320 may be provided in a second zone 102. That is, it is possible to provide a rotor core 100 configured such that the number of fixing protrusions is reduced to half the number of fixing protrusions provided in the rotor core 100.

Rotor cores 100 may be stacked such that the first zones 101, in which the first fixing protrusions 310 and the second fixing protrusions 320 are provided, and the second zones 102, in which neither first fixing protrusions 310 nor second fixing protrusions 320 are provided, overlap each other, whereby it is possible to maximally maintain force necessary to fix permanent magnets 200. The first zones 101 and the second zones 102 are alternately stacked in a vertical state at specific positions of the rotor core 100s, which is advantageous to fix the permanent magnets 200.

According to the exemplary embodiment of the present invention, it is possible to reduce the number of fixing protrusions provided in one rotor core as the result of rotational stacking of the rotor cores, between which tolerance may be generated. The number of fixing protrusions provided in each of the rotor cores according to various exemplary embodiments of the present invention may be half the number of fixing protrusions provided to fix opposite surfaces of the permanent magnets. Consequently, magnetic flux leakage may be reduced as the result of reduction in the number of fixing protrusions, which leads to an increase in torque density of the driving motor.

According to the exemplary embodiment of the present invention, it is possible to reduce the number of fixing protrusions as the result of rotational stacking of the rotor cores, which are manufactured to have a single shape, and therefore it is possible to simplify the process and to reduce manufacturing cost, compared to the case in which rotor cores having different shapes are manufactured.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A rotor applied to a driving motor and including a plurality of rotor cores configured to define a plurality of slots, into which permanent magnets are inserted,
   wherein each of the plurality of rotor cores includes a first zone and a second zone different from each other in terms of positions at which fixing protrusions configured to fix a pair of the permanent magnets are provided in the plurality of slots,
   wherein the plurality of rotor cores is stacked so that the first zones in a predetermined number of the plurality of rotor cores overlap the second zones in a predetermined number of the rotor cores,
   wherein among the fixing protrusions, a first fixing protrusion configured to contact first surfaces of the pair of the permanent magnets in a direction in which the permanent magnets extend is disposed in the first zone,
   wherein among the fixing protrusions, a second fixing protrusion configured to contact with second surfaces of the pair of the permanent magnets in a direction in which the permanent magnets extend is disposed in the second zone, and
   wherein the second surfaces are surfaces adjacent to an axis of the driving motor and the axis of the driving motor is an axis at which magnetic flux of the driving motor is generated, and defined in a space between the pair of permanent magnets.

2. The rotor according to claim 1, wherein the fixing protrusions are provided asymmetrically based on a shaft key of the plurality of rotor cores.

3. The rotor according to claim 1,
   wherein each of the plurality of rotor cores includes a first shaft key and a second shaft key configured to be coupled to recesses of a shaft of the driving motor,
   wherein the plurality of rotor cores includes first rotor cores and second rotor cores having different stacking directions, and
   wherein the first rotor cores and the second rotor cores are stacked so that the first shaft keys of the first rotor cores and the second shaft keys of the second rotor cores overlap each other.

4. The rotor according to claim 3,
   wherein the first zones of the first rotor cores and the second zones of the second rotor cores are stacked to overlap each other, and
   wherein a first surface and a second surface of the permanent magnets are fixed in directions in which the permanent magnets extend by the first fixing protrusions provided in the first zone and the second fixing protrusions provided in the second zone.

5. The rotor according to claim 3, wherein the second rotor cores are stacked after the first rotor cores are stacked to form the rotor.

6. The rotor according to claim 3, wherein the first rotor cores and the second rotor cores are alternately stacked to form the rotor.

7. The rotor according to claim 1,
   wherein each of the plurality of rotor cores includes eight poles,
   wherein the first zone is a zone occupied by four successive poles, among the eight poles, and
   wherein the second zone is a zone other than the first zone.

8. The rotor according to claim 7, wherein a position of a fixing protrusion provided in one pole of the eight poles, among the fixing protrusions, is different from a position of a fixing protrusion provided in another pole of the eight poles, among the fixing protrusions, another pole being disposed opposite to the one pole based on a rotation shaft hole of the rotor.

9. A rotor applied to a driving motor and including a plurality of rotor cores configured to define a plurality of slots, into which permanent magnets are inserted,
   wherein each of the plurality of rotor cores includes a first zone and a second zone different from each other in terms of positions at which fixing protrusions configured to fix a pair of the permanent magnets are provided in the plurality of slots,
   wherein the plurality of rotor cores is stacked so that the first zones in a predetermined number of the plurality of rotor cores overlap the second zones in a predetermined number of the rotor cores,
   wherein the fixing protrusions are provided at a first side of the first zone divided by an axis of the driving motor configured for one pole of the rotor,
   wherein the fixing protrusions are provided at a second side of the second zone, and
   wherein the axis of the driving motor is an axis at which magnetic flux of the driving motor is generated, and defined in a space between the pair of the permanent magnets.

10. A rotor applied to a driving motor, the rotor including a plurality of rotor cores configured to define a plurality of slots, into which permanent magnets are inserted,
    wherein each of the plurality of rotor cores includes a first zone provided with fixing protrusions configured to fix a pair of the permanent magnets and a second zone provided with no fixing protrusions,
    wherein the plurality of rotor cores is stacked so that the first zones in a predetermined number of the plurality of rotor cores overlap the second zones in a predetermined number of the rotor cores,
    wherein the fixing protrusions provided in the first zone are contacted with at least one of first surfaces and second surfaces of the pair of permanent magnets, and
    wherein the second surfaces are surfaces adjacent to an axis of the driving motor and the axis of the driving motor is an axis at which magnetic flux of the driving motor is generated, and defined in a space between the pair of permanent magnets.

11. The rotor according to claim 10, wherein the fixing protrusions are provided asymmetrically based on a shaft key of the plurality of rotor cores.

12. The rotor according to claim 10,
    wherein each of the plurality of rotor cores includes a first shaft key and a second shaft key configured to be coupled to recesses of a shaft of the driving motor, wherein the plurality of rotor cores includes first rotor cores and second rotor cores having different stacking directions, and wherein the first rotor cores and the second rotor cores are stacked so that the first shaft keys of the first rotor cores and the second shaft keys of the second rotor cores overlap each other.

13. The rotor according to claim 10, wherein each of the plurality of rotor cores includes eight poles, wherein the first zone is a zone occupied by four successive poles, among the eight poles, and wherein the second zone is a zone other than the first zone.

* * * * *